United States Patent
Robinson et al.

(10) Patent No.: US 7,319,957 B2
(45) Date of Patent: Jan. 15, 2008

(54) HANDWRITING AND VOICE INPUT WITH AUTOMATIC CORRECTION

(75) Inventors: Alex Robinson, Maple Valley, WA (US); Ethan Bradford, Seattle, WA (US); David Kay, Seattle, WA (US); Pim Van Meurs, Kenmore, WA (US); James Stephanick, Seattle, WA (US)

(73) Assignee: Tegic Communications, Inc., Seattle, WA (US)

( * ) Notice: Subject to any disclaimer, the term of this patent is extended or adjusted under 35 U.S.C. 154(b) by 67 days.

(21) Appl. No.: 11/043,506

(22) Filed: Jan. 25, 2005

(65) Prior Publication Data

US 2005/0234722 A1    Oct. 20, 2005

Related U.S. Application Data

(60) Provisional application No. 60/544,170, filed on Feb. 11, 2004.

(51) Int. Cl.
*G10L 15/00* (2006.01)
(52) U.S. Cl. ..................... 704/252; 704/257
(58) Field of Classification Search ............. 704/252, 704/257
See application file for complete search history.

(56) References Cited

U.S. PATENT DOCUMENTS

| | | | |
|---|---|---|---|
| 4,164,025 A | | 8/1979 | Dubnowski et al. |
| 5,018,201 A | * | 5/1991 | Sugawara ................... 704/252 |
| 5,131,045 A | | 7/1992 | Roth |
| 5,133,012 A | * | 7/1992 | Nitta ........................... 704/251 |
| 5,303,299 A | | 4/1994 | Hunt et al. |
| 5,680,511 A | * | 10/1997 | Baker et al. ................. 704/257 |
| 5,896,321 A | | 4/1999 | Miller et al. |
| 5,917,890 A | | 6/1999 | Brotman et al. |
| 5,917,941 A | | 6/1999 | Webb et al. |
| 5,926,566 A | | 7/1999 | Wang et al. |
| 6,178,401 B1 | * | 1/2001 | Franz et al. ................. 704/255 |
| 6,208,966 B1 | | 3/2001 | Bulfer |
| 6,304,844 B1 | | 10/2001 | Pan et al. |
| 6,363,347 B1 | | 3/2002 | Rozak |
| 6,584,179 B1 | | 6/2003 | Fortier et al. |
| 6,633,846 B1 | * | 10/2003 | Bennett et al. ............. 704/257 |
| 6,665,640 B1 | * | 12/2003 | Bennett et al. ............. 704/257 |

(Continued)

FOREIGN PATENT DOCUMENTS

WO    WO 04/111812    6/2004

(Continued)

*Primary Examiner*—Daniel Abebe
(74) *Attorney, Agent, or Firm*—Michael A. Glenn; Glenn Patent Group (57) ABSTRACT

A hybrid approach to improve handwriting recognition and voice recognition in data process systems is disclosed. In one embodiment, a front end is used to recognize strokes, characters and/or phonemes. The front end returns candidates with relative or absolute probabilities of matching to the input. Based on linguistic characteristics of the language, e.g. alphabetical or ideographic language for the words being entered, e.g. frequency of words and phrases being used, likely part of speech of the word entered, the morphology of the language, or the context in which the word is entered), a back end combines the candidates determined by the front end from inputs for words to match with known words and the probabilities of the use of such words in the current context.

25 Claims, 7 Drawing Sheets

U.S. PATENT DOCUMENTS

| | | |
|---|---|---|
| 6,728,348 B2 | 4/2004 | Deneberg et al. |
| 6,801,659 B1 | 10/2004 | O'Dell |
| 7,020,849 B1 | 3/2006 | Chen |
| 2003/0179930 A1 | 9/2003 | Conrad et al. |
| 2004/0049388 A1 | 3/2004 | Roth et al. |

FOREIGN PATENT DOCUMENTS

| | | |
|---|---|---|
| WO | WO 04/111871 | 6/2004 |
| WO | WO 06/026908 | 8/2005 |

* cited by examiner

*ottcn* 0
*attcn* 0
*oftcn* 0
*aftcn* 0
*otfcn* 0
*offcn* 0
*affcn* 0
*otten* 0
*atten* 0
*often* 1 x 0.6 x 0.34 x 0.5 x 0.32 x 0.42 = 0.0137
*aften* 0
*otfen* 0
*atfen* 0
*offen* 0
*affen* 0
*ottcr* 0
*attcr* 0
*oftcr* 0
*aftcr* 0
*otfcr* 0
*atfcr* 0
*offcr* 0
*affcr* 0
*otter* 0
*atter* 0
*ofter* 0
*after* 1 x 0.24 x 0.34 x 0.5 x 0.32 x 0.3 = 0.0039
*otfer* 0
*atfer* 0
*offer* 1 x 0.6 x 0.34 x 0.42 x 0.32 x 0.3 = 0.0082
*affer* 0

HANDWRITING AND VOICE INPUT WITH AUTOMATIC CORRECTION

CROSS REFERENCE TO RELATED APPLICATIONS

This application claims priority to U.S. provisional patent application Ser. No. 60/544,170 filed 11 Feb. 2004, which application is incorporated herein in its entirety by this reference thereto.

BACKGROUND OF THE INVENTION

1. Technical Field

The present invention relates to the recognition of human language input using data processing systems, such as handwriting recognition and voice recognition on desktop computers, handhold computers, personal data assistants, etc.

2. Description of the Prior Art

Text input on small devices is a challenging problem due to the memory constraints, severe size restrictions of the form factor, and the severe limits in the controls (buttons, menus etc) for entering and correcting text. Today's handheld computing devices which accept text input are becoming smaller still. Recent advances from portable computers, handheld computers, and personal data assistants to two-way paging, cellular telephones, and other portable wireless technologies have led to a demand for a small, portable, user friendly user interface to accept text input to compose documents and messages, such as for two-way messaging systems, and especially for systems which can both send and receive electronic mail (e-mail) or short messages.

For many years, portable computers have been getting smaller and smaller. One size-limiting component in the effort to produce a smaller portable computer has been the keyboard. If standard typewriter-size keys are used, the portable computer must be at least as large as the keyboard. Miniature keyboards have been used on portable computers, but the miniature keyboard keys have been found to be too small to be easily or quickly manipulated with sufficient accuracy by a user. Incorporating a full-size keyboard in a portable computer also hinders true portable use of the computer. Most portable computers cannot be operated without placing the computer on a flat work surface to allow the user to type with both hands. A user cannot easily use a portable computer while standing or moving.

Handwriting recognition is one approach that has been taken to solve the text input problem on small devices that have an electronically sensitive screen or pad that detects motion of a finger or stylus. In the latest generation of small portable computers, called Personal Digital Assistants (PDAs), companies have attempted to address this problem by incorporating handwriting recognition software in the PDA. A user may directly enter text by writing on a touch-sensitive panel or display screen. This handwritten text is then converted into digital data by the recognition software. Typically, the user writes one character at time and the PDA recognizes one character at time. The writing on the touch-sensitive panel or display screen generates a stream of data input indicating the contact points. The handwriting recognition software analyzes the geometric characteristics of the stream of data input to determine a character that may match to what the user is writing. The handwriting recognition software typically performs geometric pattern recognition to determine the handwritten characters. Unfortunately, the accuracy of the handwriting recognition software has to date been less than satisfactory. Current handwriting recognition solutions have many problems: such as the handwriting recognition systems, even on powerful personal computers, are not very accurate; on small devices, memory limitations further limiting handwriting recognition accuracy; and individual handwriting styles may differ from those used to train the handwriting software. It is for these reasons that many handwriting or 'graffiti' products require the user to learn a very specific set of strokes for the individual letters. These specific sets of strokes are designed to simplify the geometric pattern recognition process of the system and increase the recognition rate. Often these strokes are very different from the natural way in which the letter is written. The end result of the problems mentioned above is very low product adoption.

Voice recognition is another approach that has been taken to solve the text input problem. A voice recognition system typically includes a microphone to detect and record the voice input. The voice input is digitized and analyzed to extract a voice pattern. Voice recognition typically requires a powerful system to process the voice input. Some voice recognition systems with limited capability have been implemented on small devices, such as on cellular phone for voice-controlled operations. For voice-controlled operations, a device only needs to recognize a few commands. Even for such a limited scope of voice recognition, a small device typically does not have a satisfactory voice recognition accuracy because voice patterns vary among different users and under different circumstances.

It would be advantageous to develop a more practical system to process human language input that is provided in a user friendly fashion, such as handwriting recognition system for handwriting written in a natural way or voice recognition system for voice input spoken in a natural way, with improved accuracy and reduced computational requirement, such as reduced memory requirement and processing power requirement.

SUMMARY OF THE DESCRIPTION

A hybrid approach to improve the handwriting recognition and voice recognition on data process systems is described herein. In one embodiment, a front end is used to recognize strokes, characters, syllables, and/or phonemes. The front end returns candidates with relative or absolute probabilities of matching to the input. Based on linguistic characteristics of the language, e.g. alphabetical or ideographic language, for the words being entered e.g. frequency of words and phrases being used, likely part of speech of the word entered, the morphology of the language; or the context in which the word is entered, a back end combines the candidates determined by the front end from inputs for words to match with known words and the probabilities of the use of such words in the current context. The back end may use wild-cards to select word candidates, use linguistic characteristics to predict a word to be completed, or the entire next word, present word candidates for user selection, and/or provide added output, e.g. automatic accenting of characters, automatic capitalization, and automatic addition of punctuation and delimiters, to help the user. In one embodiment, a linguistic back end is used simultaneously for multiple input modalities, e.g. speech recognition, handwriting recognition, and keyboard 206 input.

One embodiment of the invention comprises a method to process language input on a data processing system, which comprises: receiving a plurality of recognition results for a plurality of word components respectively for processing a user input of a word of a language, and determining one or more word candidates for the user input of the word from the plurality of recognition results and from data indicating probability of usage of a list of words. At least one of the plurality of recognition results comprises a plurality of word component candidates and a plurality of probability indicators. The plurality of probability indicators indicate degrees of probability of matching of the plurality of word components to a portion of the user input relative to each other.

In one embodiment, the word component candidates comprise one stroke from handwriting recognition, character from handwriting recognition, and phoneme from speech recognition. The language may be alphabetical or ideographic.

In one embodiment, determining one or more word candidates comprises: eliminating a plurality of combinations of word component candidates of the plurality of recognition results, selecting a plurality of word candidates from a list of words of the language, the plurality of word candidates containing combinations of word component candidates of the plurality of recognition results, determining one or more likelihood indicators for the one or more word candidates to indicate relative possibilities of matching to the user input of the word from the plurality of recognition results and from data indicating probability of usage of a list of words, or sorting the one or more word candidates according to the one or more likelihood indicators.

In one embodiment, one candidate is automatically selected from the one or more word candidates and presented to the user. The automatic selection may be performed according to any of phrases in the language, word pairs in the language, and word trigrams in the language. Automatic selection may also be performed according to any of morphology of the language, and grammatical rules of the language. Automatic selection may also be performed according to a context in which the user input of the word is received.

In one embodiment, the method further comprises predicting a plurality of word candidates based on the automatically selected word in anticipation of a user input of a next word.

In one embodiment, the method comprises presenting the one or more word candidates for user selection, and receiving a user input to select one from the plurality of word candidates. The plurality of word candidates is presented in an order according to the one or more likelihood indicators.

In one embodiment, a plurality of word candidates are further presented based on the selected word in anticipation of a user input of a next word.

In one embodiment, one of the plurality of recognition results for a word component comprises an indication that any one of a set of word component candidates has an equal probability of matching a portion of the user input for the word. The data indicating probability of usage of the list of words may comprise any of frequencies of word usages in the language, frequencies of word usages by a user, and frequencies of word usages in a document.

In one embodiment, the method further comprises any of automatically accenting one or more characters, automatically capitalizing one or more characters, automatically adding one or more punctuation symbols, and automatically adding one or more delimiters.

One embodiment of the invention comprises a method for recognizing language input on a data processing system, which method comprises: processing a user input of a word of a language through pattern recognition to generate a plurality of recognition results for a plurality of word components respectively, and determining one or more word candidates for the user input of the word from the plurality of recognition results and from data indicating probability of usage of a list of words. At least one of the plurality of recognition results comprises a plurality of word component candidates and a plurality of probability indicators.

The plurality of probability indicators indicate degrees of probability of matching of the plurality of word components to a portion of the user input relative to each other. The pattern recognition may include handwriting recognition, in which each of the plurality of word component candidates includes a stroke, e.g. for an ideographic language symbol or an alphabetical character, or a character, e.g. for an alphabetical language. The word may be an alphabetical word or an ideographic language symbol. The pattern recognition may include speech recognition, in which each of the plurality of word component candidates comprises a phoneme.

In one embodiment, one of the plurality of recognition results for a word component comprises an indication that any one of a set of word component candidates has an equal probability of matching a portion of the user input for the word. The set of word component candidates comprises all alphabetic characters of the language. The data indicating probability of usage of the list of words may comprise any of frequencies of word usages in the language, frequencies of word usages by a user, and frequencies of word usages in a document. The data indicating probability of usage of the list of words may comprise any of phrases in the language, word pairs in the language, and word trigrams in the language. The data indicating probability of usage of the list of words may comprise any of data representing morphology of the language, and data representing grammatical rules of the language. The data indicating probability of usage of the list of words may comprise: data representing a context in which the user input of the word is received.

In one embodiment, the user input specifies only a portion of a complete set of word components for the word. The system determines the word candidates.

In one embodiment, the one or more word candidates comprise a portion of words formed from combinations of word component candidates in the plurality of recognition results and a portion of words containing combinations of word component candidates in the plurality of recognition results.

In one embodiment, the one or more word candidates comprise a plurality of word candidates. The method further comprises: presenting the plurality of word candidates for selection, and receiving a user input to select one from the plurality of word candidates.

In one embodiment, the method further comprises: predicting one or more word candidates based on the selected one in anticipation of a user input of a next word.

In one embodiment, the plurality of word candidates are presented in an order of likelihood of matching to the user input of the word.

In one embodiment, the method further comprises: automatically selecting a most likely one from the one or more word candidates as a recognized word for the user input of the word.

In one embodiment, the method further comprises: predicting one or more word candidates based on the most likely one in anticipation of a user input of a next word.

In one embodiment, the method further comprises any of automatically accenting one or more characters, automatically capitalizing one or more characters, automatically adding one or more punctuation symbols, and automatically adding one or more delimiters.

In one embodiment, each of the plurality of recognition results comprises a plurality of probability indicators associated with a plurality of word component candidates respectively to indicate relative likelihood of matching a portion of the user input.

DETAILED DESCRIPTION OF A PREFERRED EMBODIMENT

Input methods, such as handwriting recognition and speech recognition, can be important alternatives to traditional keyboard based input methods, especially for small devices, such as handheld computers, personal data assistants, and cellular phones. Traditional handwriting and speech recognition systems face the difficulty of requiring more memory than is available for them on small electronic devices. The invention advances the art of text and speech input on these devices through the use of automatic correction to reduce the memory necessary and processing power requirements for the handwriting or speech recognition engine.

The invention uses a hybrid approach to improve the handwriting recognition and voice recognition of data processing systems. In one embodiment, a front end recognizes strokes, characters, syllables, and/or phonemes and returns candidates with relative or absolute probabilities of matching to the input. Instead of using the front end to select only one candidate, different candidates can be returned for further processing by a back end. The back end combines the candidates determined by the front end from inputs for words to match with known words and the probabilities of the use of such words in the current context. By combining the front end and the back end, the invention provides a system that has an improved recognition rate and more user friendliness. An efficient and low memory/CPU implementation for handwriting and voice recognition input then becomes feasible.

For this invention, a "word" means any linguistic object, such as a string of one or more characters or symbols forming a word, word stem, prefix or suffix, syllable, phrase, abbreviation, chat slang, emoticon, user ID, URL, or ideographic character sequence.

In one embodiment of the invention, a front end is used to perform the pattern recognition on the language input, such as handwriting, voice input, etc. Many different techniques have been used to match the input against a number of target patterns, such as strokes, characters in handwriting, and phonemes in voice input. Typically, an input matches a number of target patterns to different degrees. For example, a handwritten letter may look like the character "a," or "c," "o," or "e." Currently available pattern recognition techniques can determine the likelihood of the handwritten letter being any of these characters. However, a recognition system is typically forced to report only one match. Thus, typically the character with the highest possibility of matching is reported as the recognition result. In one embodiment of the invention, instead of prematurely eliminating the other candidates to obtain one match, which can be incorrect, a number of candidates are propagated into the back end as possible choices so that the back end uses the context to determine more likely combinations of the candidates as a whole for the language input, such as a word, a phrase, word pairs, word trigrams, or a word that fits into the context of a sentence e.g. according to grammatical construction. For example, different word candidates can be determined from the combinations of the different candidates for the characters in the word the user is trying to input. From the frequencies of the words used in the language and the relative or absolute possibilities of matching of the character candidates, the back end can determine the most likely word the user is inputting. This is in contrast to the traditional methods which provide a set of individually determined, most likely characters, which may not even make up a meaningful word.

Thus, the invention combines disambiguating word lookup software with a handwriting recognition (HR) engine or a speech recognition (SR) engine to provide a powerful solution to the persistent problem of text and speech input on small electronic devices, such as personal digital assistants, telephones, or any of the many specialized devices used in industry for the input of text and data in the field.

In addition, the invention uses a single back end engine to serve several input modalities (qwerty keyboard, handwriting, voice) effectively with low memory and processor requirements.

Figure 1:
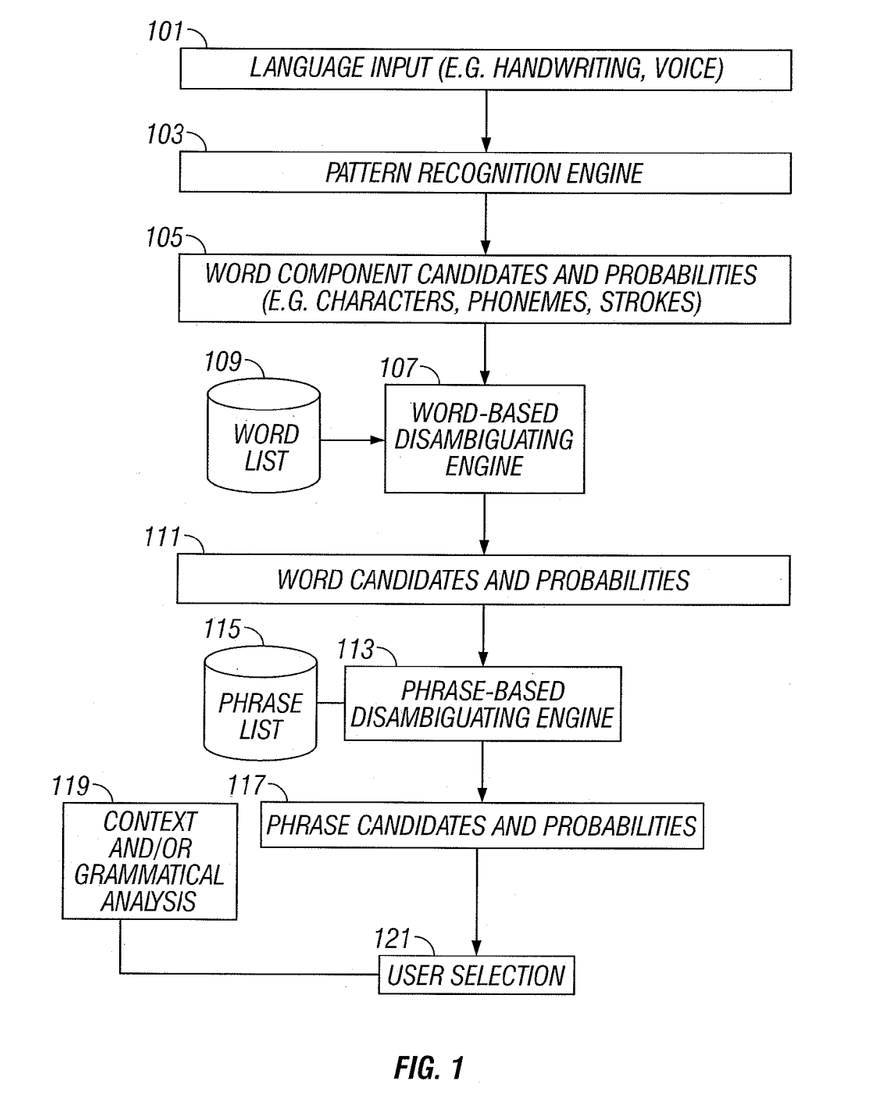
FIG. 1 illustrates a system for recognizing user input on a data processing system according to the invention.

FIG. 1 illustrates a diagram of a system for recognizing user input on a data processing system according to the invention. After language input 101 e.g. handwriting, or voice is received at the pattern recognition engine 103, the pattern recognition engine 103 processes the input to provide word component candidates e.g. characters, phonemes, or strokes and their probabilities of matching to the corresponding portions of the input 105. For example, an input for a character may be matched to a list of character candidates, which cause ambiguity. In one embodiment, the ambiguity is tolerated at the front end level and propagated into the linguistic disambiguating back end for further processing.

For example, a word based disambiguating engine 107 checks the possible combinations of the characters against the word list 109 to generate word candidates and their associated probabilities of matching to the user input 111. Because less frequently used words or unknown words e.g. words not in the words list 109 are less likely a match to the user input, such word candidates can be down graded to have smaller probability of matching, even though, based on the result of the pattern recognition engine 105 they would seem to have a relatively high probability of matching. The word based disambiguating engine 107 can eliminate some unlikely word candidates so that a user is not bothered with a huge list of choices. Alternatively, the word based disambiguating engine may select a most likely word from the word candidates.

In one embodiment, if ambiguity exists in the output of the word based disambiguating engine 107, a phrase based disambiguating engine 113 further checks the result against the phrase list 115, which may include word bi-grams, trigrams, etc. One or more previously recognized words may be combined with the current word to match with the phrases in the phrase list 115. The usage frequency of the phrases can be used to modify the probabilities of matching for the word candidates to generate the phrase candidates and their associated probabilities of matching 117. Even when no ambiguity exists, the phrase based disambiguating engine may be used to predict the next word based on the previously recognized word and the phrase list 115.

Figure 2:
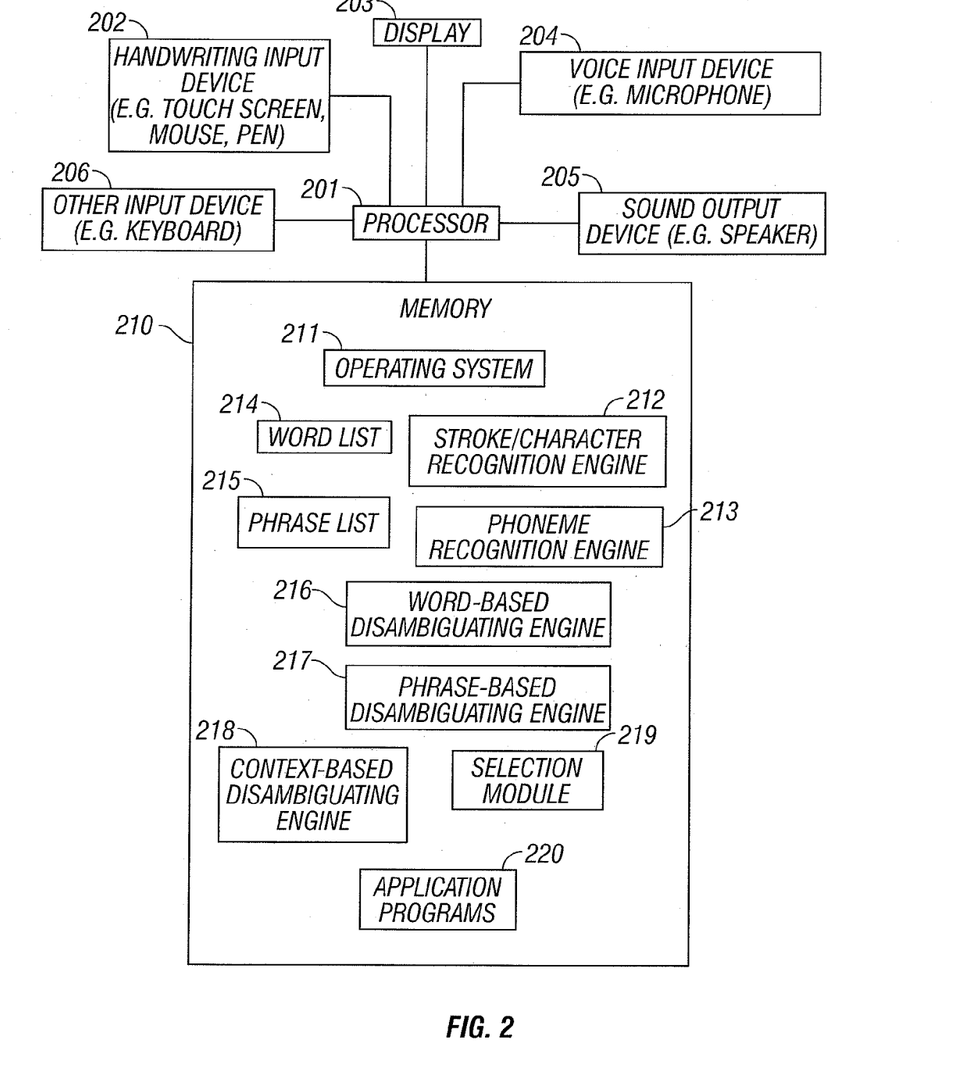
FIG. 2 is a block diagram of a data processing system for recognizing user input according to the present invention.

In one embodiment, if ambiguity exists in the output of the phrase based disambiguating engine 113, a context and/or grammatical analysis 119 is performed to eliminate unlikely words/phrases. If the ambiguity cannot be resolved through the automated linguistic disambiguating process, the choices can be presented to the user for user selection 121. After the user selection, the word list 109 and the phrase list 115 may be updated to promote the words/phrases selected by the user and/or add new words/phrases into the lists. FIG. 2 is block diagram of a data processing system for recognizing user input according to the invention. Although FIG. 2 illustrates various components of an example data processing system, it is understood that a data processing system according to one embodiment of the present invention in general may include more or less components than those illustrated in FIG. 2. For example, some systems may not have a voice recognition capability and may not need the components for the processing of sounds. Some systems may have other functionalities not illustrated in FIG. 2, such as communication circuitry on a cellular phone embodiment. FIG. 2 illustrates various components closely related to at least some features of the invention. For this description, a person skilled in the art would understand that the arrangements of a data processing system according to the invention are not limited to the particular architecture illustrated in FIG. 2.

The display 203 is coupled to the processor 201 through appropriate interfacing circuitry. A handwriting input device 202, such as a touch screen, a mouse, or a digitizing pen, is coupled to the processor 201 to receive user input for handwriting recognition and/or for other user input. A voice input device 204, such as a microphone, is coupled to the processor 201 to receive user input for voice recognition and/or for other sound input. Optionally, a sound output device 205, such as a speaker, is also coupled to the processor.

The processor 201 receives input from the input devices, e.g. the handwriting input device 202 or the voice input device 204 and manages output to the display and speaker. The processor 201 is coupled to a memory 210. The memory includes a combination of temporary storage media, such as random access memory (RAM), and permanent storage media, such as read-only memory (ROM), floppy disks, hard disks, or CD-ROMs. The memory 210 contains all software routines and data necessary to govern system operation. The memory typically contains an operating system 211 and application programs 220. Examples of application programs include word processors, software dictionaries, and foreign language translators. Speech synthesis software may also be provided as an application program.

Preferably, the memory further contains a stroke/character recognition engine 212 for recognizing strokes/characters in the handwriting input and/or a phoneme recognition engine 213 for recognizing phonemes in the voice input. The phoneme recognition engine and the stroke/character recognition engine can use any techniques known in the field to provide a list of candidates and associated probability of matching for each input for stroke, character or phoneme. It is understood that the particular technique used for the pattern recognition in the front end engine, e.g. the stroke/character recognition engine 212 or the phoneme recognition engine 213, is not germane to the invention.

In one embodiment of the invention, the memory 210 further includes a linguistic disambiguating back end, which may include one or more of a word base disambiguating engine 216, a phrase based recognition disambiguating engine 217, a context based disambiguating engine 218, a selection module 219, and others, such as a word list 214 and a phrase list 215. In this embodiment, the context based disambiguating engine applied contextual aspects of the user's actions toward input disambiguation. For example, a vocabulary may be selected based upon selected user location, e.g. is the user at work or at home?; time of day, e.g. working hours vs. leisure time; recipient; etc.

In one embodiment of the invention, the majority of the components for a disambiguating back end are shared among different input modalities e.g. for handwriting recognition and for speech recognition. The word list 214 comprises a list of known words in a language. The word list 214 may further comprise the information of usage frequencies for the corresponding words in the language. In one embodiment, a word not in the word list 214 for the language is considered to have a zero frequency. Alternatively, an unknown word may be assigned a very small frequency of usage. Using the assumed frequency of usage for the unknown words, the known and unknown words can be processed in a substantially same fashion. The word list 214 can be used with the word based disambiguating engine 216 to rank, eliminate, and/or select word candidates determined based on the result of the pattern recognition front end (e.g., the stroke/character recognition engine 212 or the phoneme recognition engine 213) and to predict words for word completion based on a portion of user inputs. Similarly, the phrase list 215 may comprise a list of phrases that includes two or more words, and the usage frequency information, which can be used by the phrase-based disambiguation engine 217 and can be used to predict words for phrase completion.

In one embodiment of the invention, each input sequence is processed with reference to one or more vocabulary modules, each of which contains one or more words, together with information about each word, including the number of characters in the word and the relative frequency of occurrence of the word with respect to other words of the same length. Alternatively, information regarding the vocabulary module or modules of which a given word is a member is stored with each word, or a module may modify or generate words based on linguistic patterns, such as placing a diacritic mark on a particular syllable, or generate or filter word candidates based on any other algorithm for interpretation of the current input sequence and/or the surrounding context. In one embodiment, each input sequence is processed by a pattern recognition front end to provide a sequence of lists of candidates, e.g. strokes, characters, syllables, phonemes, etc. Different combinations of the candidates provide different word candidates. The disambiguating back end combines the probability of matching of the candidates and the usage frequencies of the word candidates to rank, eliminate, and/or select one word or more words as alternatives for user selection. Words of higher usage frequency are highly likely candidates. Unknown words or words of lower usage frequency are less likely candidates. The selection module 219 selectively presents a number of highly likely words from which the user may select. In another embodiment of the present invention, the usage frequency of words is based on the usage of the user or the usage of the words in a particular context, e.g. in a message or article being composed by the user. Thus, the frequently used words become more likely words.

In another embodiment, words in each vocabulary module are stored such that words are grouped into clusters or files consisting of words of the same length. Each input sequence is first processed by searching for the group of words of the same length as the number of inputs in the input sequence, and identifying those candidate words with the best matching metric scores. If fewer than a threshold number of candidate words are identified which have the same length as the input sequence, then the system proceeds to compare the input sequence of N inputs to the first N letters of each word in the group of words of length N+1. This process continues, searching groups of progressively longer words and comparing the input sequence of N inputs to the first N letters of each word in each group until the threshold number of candidate words is identified. Viable candidate words of a length longer than the input sequence may be offered to the user as possible interpretations of the input sequence, providing a form of word completion.

During the installation phase, or continuously upon the receipt of text messages or other data, information files are scanned for words to be added to the lexicon. Methods for scanning such information files are known in the art. As new words are found during scanning, they are added to a vocabulary module as low frequency words and, as such, are placed at the end of the word lists with which the words are associated. Depending on the number of times that a given new word is detected during a scan, it is assigned a relatively higher and higher priority, by promoting it within its associated list, thus increasing the likelihood of the word appearing in the word selection list during information entry.

In one embodiment of the invention, for each input sequence a vocabulary module constructs a word candidate by identifying the word component candidate with the highest probability and composing a word consisting of the sequence of word component candidate. This "exact type" word is then included in the word candidate list, optionally presented in a specially designated field. The lexicon of words has an appendix of offensive words, paired with similar words of an acceptable nature, such that entering the offensive word, even through exact typing of the letters comprising the offensive word, yields only the associated acceptable word in the exact type field, and if appropriate as a suggestion in the word selection list. This feature can filter out the appearance of offensive words which might appear unintentionally in the selection list once the user learns that it is possible to type more quickly when less attention is given to contacting the keyboard at the precise location of the intended letters. Thus, using techniques that are well known in the art, prior to displaying the exact type word string, the software routine responsible for displaying the word choice list compares the current exact type string with the appendix of offensive words and, if a match is found, replaces the display string with the associated acceptable word. Otherwise, even when an offensive word is treated as a very low frequency word, it would still appear as the exact type word when each of the letters of the word is directly contacted. Although this is analogous to accidentally typing an offensive word on a standard keyboard, the invention tolerates the user providing inputs with less accuracy. This feature can be enabled or disabled by the user, for example, through a system menu selection.

Those skilled in the art will also recognize that additional vocabulary modules can be enabled within the computer, for example vocabulary modules containing legal terms, medical terms, and other languages. Further, in some languages, such as Indic languages, the vocabulary module may employ "templates" of valid sub-word sequences to determine which word component candidates are possible or likely given the preceding inputs and the word candidates being considered. Via a system menu, the user can configure the system to cause the additional vocabulary words to appear first or last in the list of possible words, e.g. with special coloration or highlighting, or the system may automatically switch the order of the words based on which vocabulary module supplied the immediately preceding selected word(s). Consequently, within the scope of the appended claims, it will be appreciated that the invention can be practiced otherwise than as specifically described herein.

In accordance with another aspect of the invention, during use of the system by a user, the lexicon is automatically modified by a promotion algorithm which, each time a word is selected by the user, acts to promote that word within the lexicon by incrementally increasing the relative frequency associated with that word. In one embodiment, the promotion algorithm increases the value of the frequency associated with the word selected by a relatively large increment, while decreasing the frequency value of those words passed over by a very small decrement. For a vocabulary module in which relative frequency information is indicated by the sequential order in which words appear in a list, promotions are made by moving the selected word upward by some fraction of its distance from the head of the list. The promotion algorithm preferably avoids moving the words most commonly used and the words very infrequently used very far from their original locations. For example, words in the middle range of the list are promoted by the largest fraction with each selection. Words intermediate between where the selected word started and finished in the lexicon promotion are effectively demoted by a value of one. Conservation of the word list mass is maintained, so that the information regarding the relative frequency of the words in the list is maintained and updated without increasing the storage required for the list.

The promotion algorithm operates both to increase the frequency of selected words, and where appropriate, to decrease the frequency of words that are not selected. For example, in a lexicon in which relative frequency information is indicated by the sequential order in which words appear in a list, a selected word which appears at position IDX in the list is moved to position (IDX/2). Correspondingly, words in the list at positions (IDX/2) down through (IDX+I) are moved down one position in the list. Words are demoted in the list when a sequence of contact points is processed and a word selection list is generated based on the calculated matching metric values, and one or more words appear in the list prior to the word selected by the user. Words that appear higher in the selection list, but are not selected, may be presumed to be assigned an inappropriately high frequency, i.e. they appear too high in the list. Such a word that initially appears at position IDX is demoted by, for example, moving it to position (IDX*2+1). Thus, the more frequently a word is considered to be selected, the less it is demoted in the sense that it is moved by a smaller number of steps.

The promotion and demotion processes may be triggered only in response to an action by the user, or it may be performed differently depending on the user's input. For example, words that appear higher in a selection list than the word intended by the user are demoted only when the user selects the intended word by clicking and dragging the intended word to the foremost location within the word selection list using a stylus or mouse. Alternatively, the selected word that is manually dragged to a higher position in the selection list may be promoted by a larger than normal factor. For example, the promoted word is moved from position IDX to position (IDX/3). Many such variations will be evident to one of ordinary skill in the art.

In accordance with another aspect of the invention, the front end may be able to detect systematic errors and adapt its recognition based on feedback from the back end. As the user repeatedly enters and selects words from the selection list; the difference between the rankings of the word component candidates and the intended word component contained in each selected word can be used to change the probabilities generated by the front end. Alternatively, the back end may maintain an independent adjustment value for one or more strokes, characters, syllables, or phonemes received from the front end.

Figure 3A:
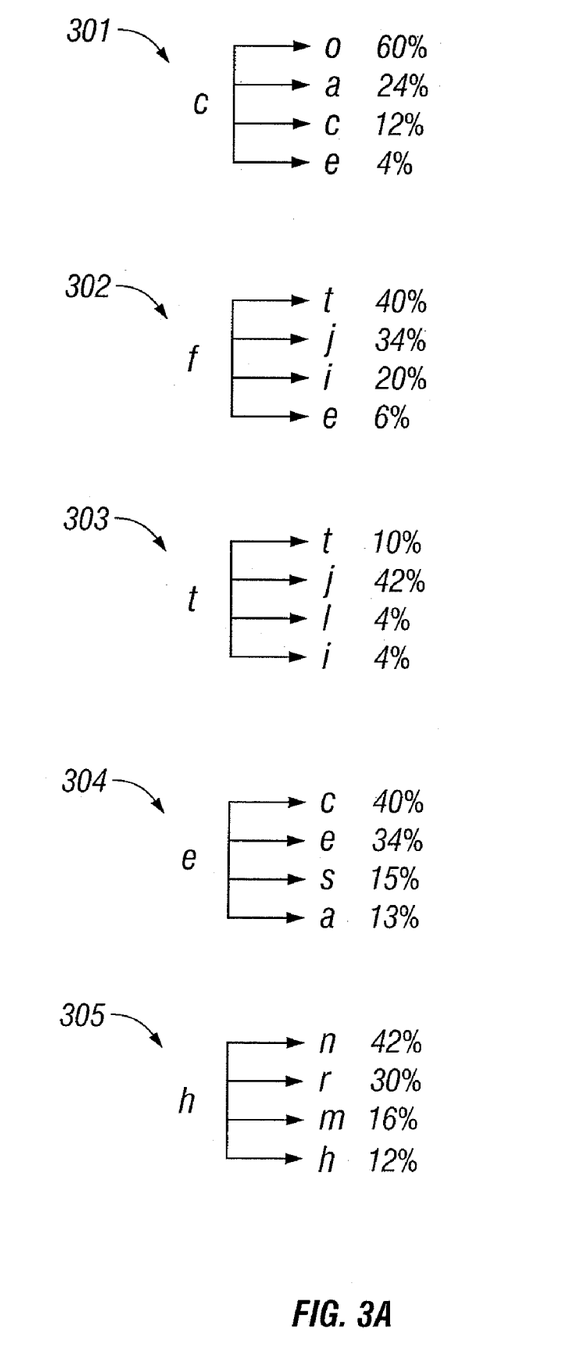
FIGS. 3A and 3B show an example of disambiguation of the output of a handwriting recognition software according to the present invention.
Figure 3B:
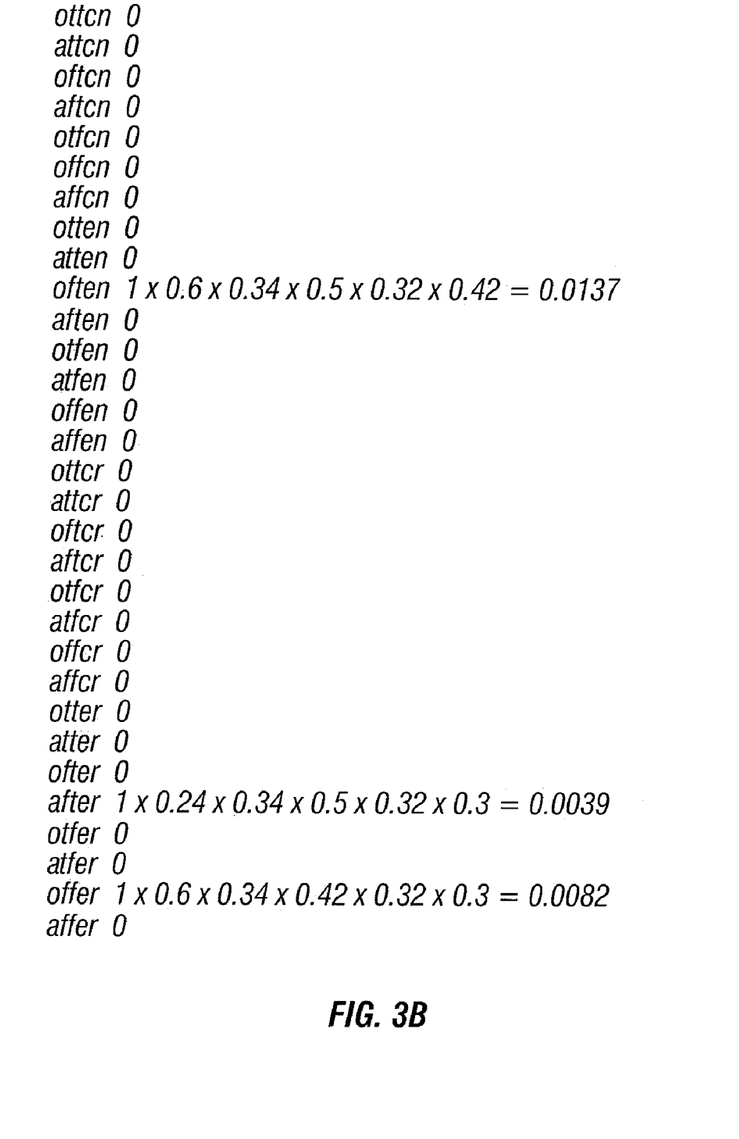

FIGS. 3A and 3B show an example of disambiguation of the output of handwriting recognition software according to the invention. One embodiment of the invention combines a handwriting recognition engine with a module that takes all of the possible matches associated with each letter entered by the user from the handwriting engine, and combines these probabilities with the probabilities of words in the language to predict for the user the most likely word or words that the user is attempting to enter. Any techniques known in the art can be used to determine the possible matches and the associated likelihood of match. For example, the user might enter five characters in an attempt to enter the five-letter word "often." The user input may appear as illustrated as 301-305 in FIG. 3A. The handwriting recognition software gives the following character and character probability output for the strokes:

Stroke 1 (301): 'o' 60%, 'a' 24%, 'c' 12%, 'e' 4%
Stroke 2 (302): 't' 40%, 'f' 34%, 'i' 20%, '1' 6%
Stroke 3 (303): 't' 50%, 'f' 42%, '1' 4%, 'i' 4%
Stroke 4 (304): 'c' 40%, 'e' 32%, 's' 15%, 'a' 13%
Stroke 5 (305): 'n' 42%, 'r' 30%, 'm' 16%, 'h' 12%

For example, the stroke 301 has 60% probability of being 'o,' stroke 302 has 40% probability of being 't,' stroke 303 has 50% probability of being 't,' stroke 304 has 40% probability of being 'c,' stroke 305 has 42% probability of being 'n.' Putting together the letters that the handwriting software found most closely matched the user's strokes, the handwriting software module presents the user with the string 'ottcn', which this is not the word that the user intended to enter. It is not even a word in the English language.

One embodiment of the invention uses a disambiguating word look-up module to find a best prediction based on these characters, probabilities of matching associated with the characters, and the frequencies of usage of words in the English language. In one embodiment of the invention, the combined handwriting module and the disambiguating module predict that the most likely word is 'often', which is the word that the user was trying to enter.

For example, as shown in FIG. 3B, a back end tool accepts all the candidates and determines that a list of possible words includes: ottcn, attcn, oftcn, aftcn, otfcn, atfcn, offcn, affcn, otten, atten, often, aften, otfen, atfen, offen, affen, ottcr, attcr, oftcr, aftcr, otfcr, atfcr, offcr, affcr, otter, atter, ofter, after, otfer, atfer, offer, affer, . . . . The possible words can be constructed from selecting characters with the highest probability of matching, determined by the front end, to characters with the lower probability of matching. When one or more highly likely words are found, the characters with lower probabilities may not be used. To simplify the description, in FIG. 3A, it is assumed that unknown words have a frequency of usage of 0 and known words e.g. often, after, and offer have a frequency o f usage of 1. In FIG. 3A, an indicator of matching for a word candidate is computed from the product of the frequency of usage and the probabilities of matching of the character candidates used in the word. For example, in FIG. 3A, the probabilities of matching to characters 'o,' 'f' 't,' 'e,' and 'n' are 0.6, 0.34, 0.5, 0.32, 0.42, respectively, and the usage frequency for the word "often" is 1. Thus, an indicator of matching for the word "often" is determined as 0.0137. Similarly, the indicator for the words "after" and "offer" are 0.0039 and 0.0082, respectively. When the back end tool selects the most likely word, "often" is selected. Note that "indicators" for the words can be normalized to rank the word candidates.

In one embodiment of the invention, one or more inputs are explicit, i.e., associated with a single stroke, character, syllable, or phoneme such that the probability of matching each character, etc., is equivalent to 100%. In another embodiment of the invention, an explicit input results in a special set of values from the recognition front end that causes the disambiguation back end to only match that exact character, etc., in the corresponding position of each word candidate. In another embodiment of the invention, explicit inputs are reserved for digits, punctuation within and between words, appropriate diacritics and accent marks, and/or other delimiters.

Figure 4A:
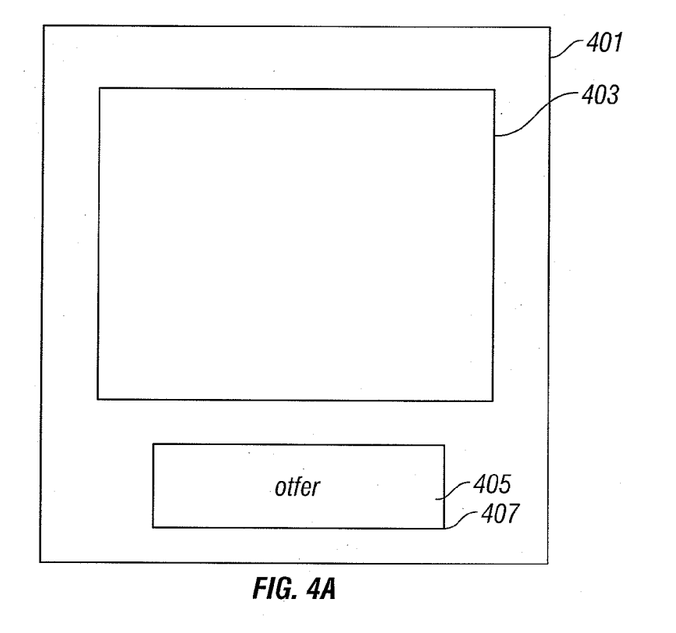
FIGS. 4A-4C show scenarios of handwriting recognition on a user interface according to the invention.
Figure 4B:
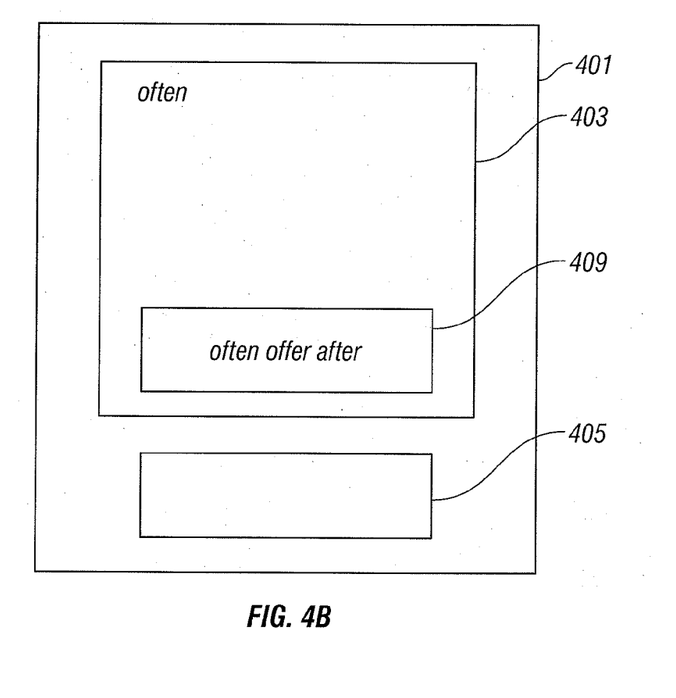
Figure 4C:
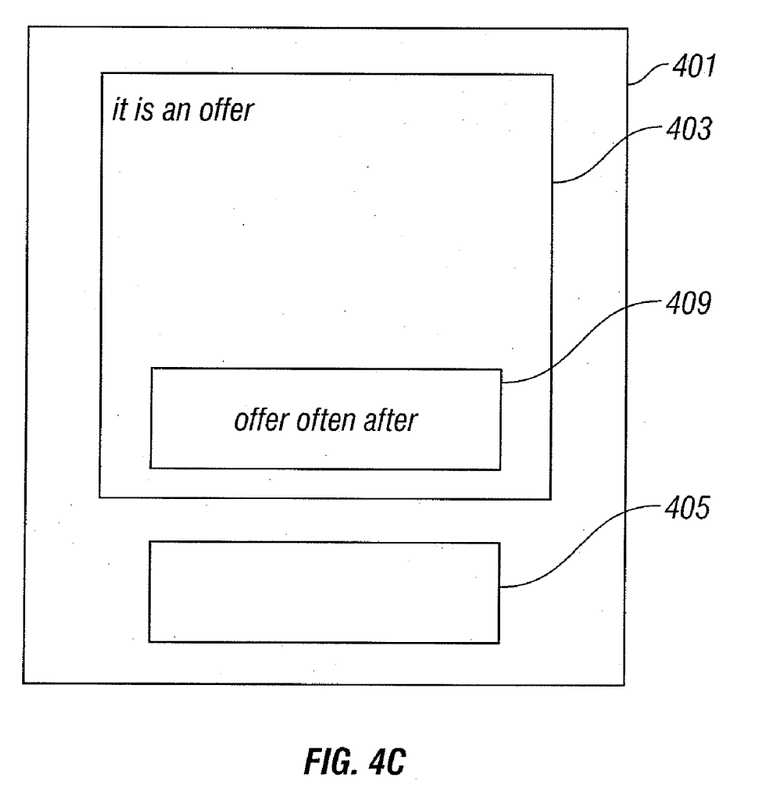

FIGS. 4A-4C show scenarios of handwriting recognition on a user interface according to the invention. As illustrated in FIG. 4A, the device 401 includes an area 405 for user to write the handwriting input 407. An area 403 is provided to display the message or article the user in entering e.g. on a web browser, on a memo software program, on an email program, etc. The device contains touch screen area for the user to write.

After processing the user handwriting input 407, as illustrated in FIG. 4B, the device provides a list of word candidates in area 409 for the user to select. The word candidates are ordered in the likelihood of matching. The device may choose to present the first few mostly likely word candidates. The user may select one word from the list using a conventional method, such as tapping a word on the list using a stylus on the touch screen, or using a numerical key corresponding to the position of the word. Alternatively, the user may use voice commands to select the word, such as by saying the selected word or the number corresponding to the position of the word in the list. In the preferred embodiment, the most likely word is automatically selected and displayed in area 403. Thus, no user selection is necessary if the user accepts the candidate, e.g. by start to writing the next word. If the user does select a different word, the device replaces the automatically selected candidate with the user-selected candidate. In another embodiment, the most likely word is highlighted as the default, indicating the user's current selection of a word to be output or extended with a subsequent action, and a designated input changes the highlighting to another word candidate. In another embodiment, a designated input selects one syllable or word for correction or reentry from a multiple-syllable sequence or multiple-word phrase that has been entered or predicted.

FIG. 4C illustrates a situation in when a contextual and/or grammatical analysis further helps to resolve the ambiguity. For example, in FIG. 4C the user already entered the words "It is an." From a grammatical analysis, the device anticipates a noun as the next word. Thus, the device further adjusts the rank of the word candidates to promote the word candidates that are nouns. Thus, the most likely words becomes "offer" instead of "often." However, because an adjective is also likely between the noun and the word "an," the devices still presents the other choices, such as "often" and "after", for user selection.

Figure 5:
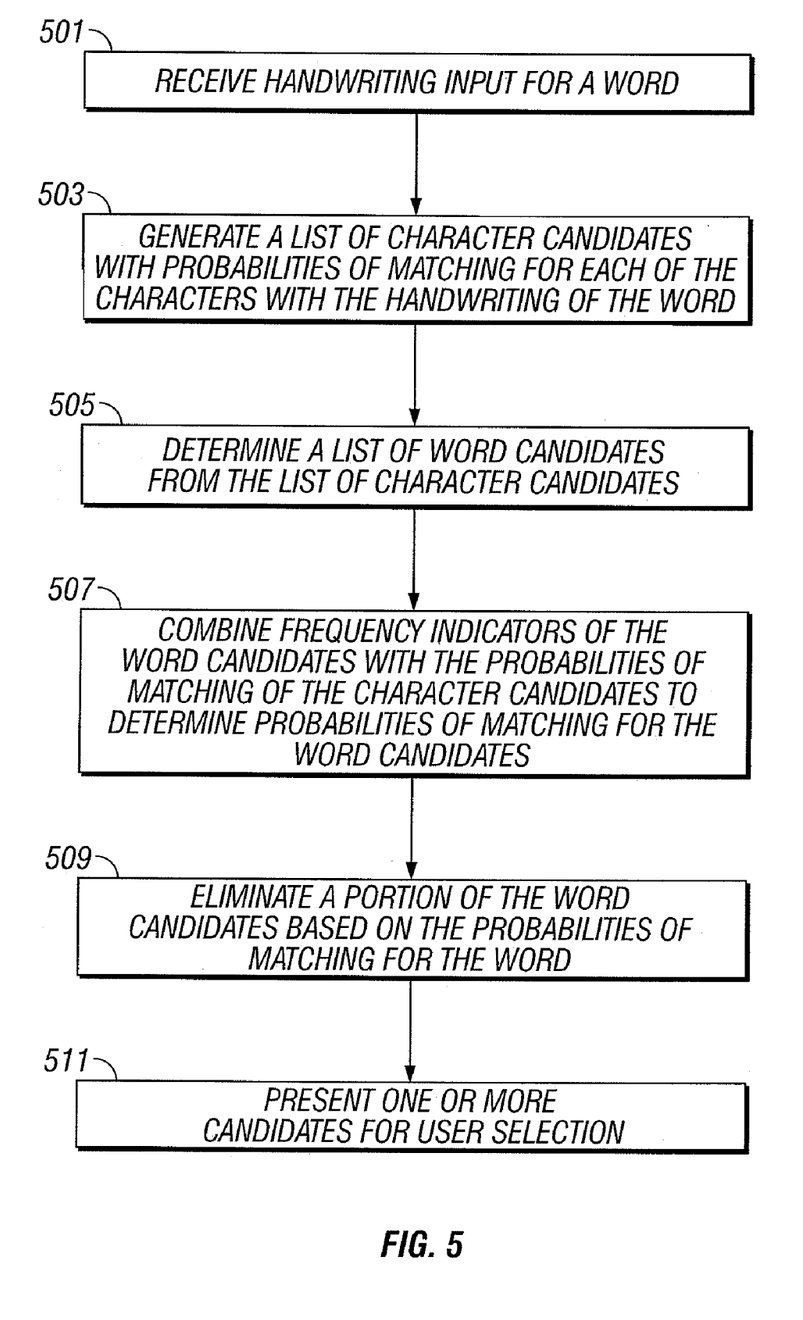
FIG. 5 is a flow diagram of processing user input according to the invention.

FIG. 5 is a flow diagram showing processing of user input according to the invention. At step 501, the system receives handwriting input for a word. Thereafter step 503 generates a list of character candidates with probability of matching for each of the characters in the handwriting of the word. Step 505 determines a list of word candidates from the list of character candidates. Step 507 combines frequency indicators of the word candidates with the probability of matching of the character candidates to determine probability of matching for the word candidates. Step 509 eliminates a portion of the word candidates, based on the probability of matching for the word candidates. Step 511 presents one or more word candidates for user selection.

Although FIG. 5 illustrates a flow diagram of processing handwriting input, it is understood from this description that voice input can also be processed in a similar fashion, where a voice recognition module generates phoneme candidates for each of the phonemes in the word.

Speech recognition technology for text and command input on small devices faces even worse memory and computer processing problems. In addition, adoption of current speech recognition systems is very low due to its high error rate and the effort associated with making corrections. One embodiment of the invention incorporates the combined use of a set of candidate phonemes and their associated probabilities returned from a speech recognition engine and a back end that uses these input and the known probabilities of the words that can be formed with these phonemes. The system automatically corrects the speech recognition output.

In one embodiment of the invention, candidate words that match the input sequence are presented to the user in a word selection list on the display as each input is received. The word candidates are presented in the order determined by the matching likelihood calculated for each candidate word, such that the words deemed to be most likely according to the matching metric appear first in the list. Selecting one of the proposed interpretations of the input sequence terminates an input sequence, so that the next input starts a new input sequence.

In another embodiment of the invention, only a single word candidate appears on the display, preferably at the insertion point for the text being generated. The word candidate displayed is that word which is deemed to be most likely according to the matching metric. By repeatedly activating a specially designated selection input, the user may replace the displayed word with alternate word candidates presented in the order determined by the matching probabilities. An input sequence is also terminated following one or more activations of the designated selection input, effectively selecting exactly one of the proposed interpretations of the sequence for actual output by the system, so that the next input starts a new input sequence.

A hybrid system according to the invention first performs pattern recognition, e.g. handwriting recognition, speech recognition, etc. at a component level, e.g. strokes, characters, syllables, phonemes, etc., to provide results with ambiguities and associated possibility of match and then performs disambiguating operations at inter-component level e.g. word, phrases, word pairs, word trigrams, etc. The characteristics of the language used by the system to resolve the ambiguity can be any of the frequency of word usage in the language, the frequency of word usage by the individual user, the likely part of speech of the word entered, the morphology of the language, the context in which the word is entered, bi-grams (word pairs) or word trigrams, and any other language or context information that can be used to resolve the ambiguity.

The present invention can be used with alphabetical languages, such as English and Spanish, in which the output of the handwriting recognition front end is characters or strokes and their associated probabilities. The disambiguating operation for the handwriting of an alphabetical language can be performed at the word level, where each word typically includes a plurality of characters.

The invention can also be used with ideographic languages, such as Chinese and Japanese, in which the output of the handwriting recognition front end is strokes and their associated probabilities. The disambiguating operation for the handwriting of an ideographic language can be performed at the radical/component or character level, where the writing of each character typically includes a plurality of strokes. The disambiguating operation can be further performed at a higher level, e.g. phrases, bi-grams, word trigrams, etc. Furthermore, the grammatical construction of the language can also be used in the disambiguating operation to select the best overall match of the input.

The invention can also be used with phonetic or alphabetic representations of ideographic languages. The disambiguating operation can be performed at the syllable, ideographic character, word, and/or phrase level.

Similarly, the invention can also be applied to speech recognition where the output of the speech recognition front end comprises phonemes and their associated probabilities of match. The phoneme candidates can be combined for the selecting of a best match for a word, phrase, bi-grams, word trigrams, or idiom.

One embodiment of the invention also predicts completions to words after the user has entered only a few strokes. For example, after successfully recognizing the first few characters of a word with high probability, the back end of the system can provide a list of words in which the first few characters are the same as the matched characters. A user can select one word from the list to complete the input. Alternatively, an indication near certain words in the list may cue the user that completions based on that word may be displayed by means of a designated input applied to the list entry; the subsequent pop-up word list shows only words incorporating the word, and may in turn indicate further completions. Each of the first few characters may have only one high probability candidate, and the first few characters have only one high probability candidate, which is used to select the list of words for completing. Alternatively, one or more of the first few characters may contain ambiguities so that a number of high probability combinations of the first few characters can be used to select the list of words for completion. The list of words for completion can be ranked and displayed according to the likelihood of being the word the user is trying to enter. The words for completion can be ranked in a similar fashion for disambiguating the input of a word. For example, the words for completion can be ranked according to the frequency of the words used e.g. in the language, by the user, in the article the user is composing, in the particular context e.g. a dialog box, etc. and/or the frequency of occurrences in phrases, bi-grams, word trigrams, idiom, etc. When one or more words immediately precede the word that is being processed is in a phrase, bi-gram, word trigram, or idiom, etc., the frequency of the occurrence of these phrase, bi-gram, word trigram, or idiom can be further combined with the frequency of the words in determining the rank of the word for completing. The words that are not in any currently known phrase, bi-gram, word trigram, idiom, etc. are assumed to be in an unknown phrase that has a very low frequency of occurrence. Similarly, words that are not in the list of known words are assumed to be an unknown phrase that has a very low frequency of occurrence. Thus, input for any word, or the first portion of a word can be processed to determine the most likely input.

In one embodiment of the invention, the back end continuously obtains the list of candidates for each of the characters, or strokes, or phonemes, recognized by the pattern recognition front end to update the list and rank of words for completion. As the user provides more input, less likely words for completion are eliminated. The list of words provided for completion reduces in size as the user provides more input, until there is no ambiguity or the user selects a word from the list. Further, before the pattern recognition front end provides a list of candidates for the first input of the next word, the back end determines words for completion from one or more immediately preceding words and the known phrase, bi-gram, word trigram, idiom, etc., to determine a list of words for completion for a phrase, bi-gram, word trigram, idiom, etc. Thus, the invention also predicts the entire next word based on last word entered by the user.

In one embodiment of the invention, the back end uses wild-cards that represent any strokes, characters, syllables, or phonemes with equal probability. The list of words for completion based on a portion of the input of the word can be considered as an example of using a wildcard for one or more strokes, characters, or phonemes to be entered by the user, or to be received from the pattern recognition front end.

In one embodiment of the invention, the front may fail to recognize a stroke, character, or phoneme. Instead of stopping the input process to force the user re-enter the input, the front end may tolerate the result and send a wild-card to the back end. At a high level, the back end may resolve the ambiguity without forcing the user to re-enter the input. This greatly improves the user friendliness of the system.

In one embodiment of the invention, the back end automatically replaces one or more inputs from the front end with wildcards. For example, when no likely words from a list of known words are found, the back end can replace the most ambiguous input with a wildcard to expand the combinations of candidates. For example, a list with a large number of low probability candidates can be replaced with a wildcard. In one embodiment, the front end provides a list of candidates so that the likelihood of the input matching one of the candidates in the list is above a threshold. Thus, an ambiguous input has a large number of low probability candidates. In other embodiments, the front end provides a list of candidates so that the likelihood of each of the candidates matching the input is above a threshold. Thus, an ambiguous input has a low probability of the input being in one of the candidates. In this way, the system employs wild-cards, e.g. strokes that stand in for any letter, giving all letters equal probability, to handle cases where no likely words are found if no wildcard is used.

In one embodiment of the invention, the back end constructs different word candidates from the combinations of candidates of strokes, characters, or phonemes, provided by the pattern recognition front end. For example, the candidates of characters for each character input can be ranked according to the likelihood of matching to the input. The construction of word candidates starts from the characters of the highest matching probabilities towards the characters with smaller matching probabilities. When a number of words candidates are found in the list of known words, the candidates with smaller matching probabilities may not be used to construct further word candidates.

In one embodiment, the system displays the most probable word or a list of all the candidate words in order of the calculated likelihood. The system can automatically add an output to help the user. This includes, for example, automatic accenting of characters, automatic capitalization, and automatic addition of punctuation and delimiters.

One embodiment of the invention, the simultaneous use of one linguistic back end for multiple input modalities, e.g. speech recognition, handwriting recognition, keyboard input on hard keys or touch screen is provided. In another embodiment of the invention, a linguistic back end is used for disambiguating the word candidates. After a back end component combines the input candidates from the front end to determine word candidates and their likelihood of matching, a linguistic back end is used for ranking the word candidates according to linguistic characteristics. For example, the linguistic back end further combines uses the frequencies of words, e.g. in the language, used by the user, in an article being composed by the user, in a context the input is required, etc., with the word candidates and their likelihood of matching from the back end component to disambiguate the word candidates. The linguistic back end can also perform a disambiguating operation based on a word bi-gram, word trigram, phrases, etc. Further, the linguistic back end can perform disambiguating operation based on the context, grammatical construction, etc. Because the task performed by the linguistic back end is the same for various different input methods, such as speech recognition, handwriting recognition, and keyboard input using hard keys or a touch screen, the linguistic back end can be shared among multiple input modalities. In one embodiment of the invention, a linguistic back end simultaneously serves multiple input modalities so that, when a user combines different input modalities to provide an input, only a single linguistic back end is required to support the mixed mode of input. In another embodiment of the invention, each input from a particular front end is treated as an explicit word component candidate that is either recorded with a matching probability of 100% or as an explicit stroke, character, or syllable that the back end will use to match only the words that contain it in the corresponding position.

The present invention also comprises a hybrid system that uses the set of candidates with associated probabilities from one or more recognition systems and that resolves the ambiguity in that set by using certain known characteristics of the language. The resolution of the ambiguity from the handwriting/speech recognition improves the recognition rate of the system to improve the user friendliness.

Although the invention is described herein with reference to the preferred embodiment, one skilled in the art will readily appreciate that other applications may be substituted for those set forth herein without departing from the spirit and scope of the present invention. Accordingly, the invention should only be limited by the claims included below.

The invention claimed is:

1. A method for processing language input in a data processing system, comprising the steps of:

receiving a plurality of recognition results for a plurality of word components, respectively, for processing a user input of a partial word of a language, at least one of the plurality of recognition results comprising a plurality of word component candidates and a plurality of probability indicators, the plurality of probability indicators indicating degrees of probability of matching of the plurality of word components to a portion of the user input relative to each other; and predicting one or more word candidates that complete the partial word from the plurality of recognition results and from data indicating probability of usage of a list of words.

2. The method of claim 1, wherein said word component candidates comprise any of:
a stroke from handwriting recognition, speech recognition or keypad entry;
a character from handwriting recognition, speech recognition or keypad entry;
a phoneme from handwriting recognition, speech recognition or keypad entry; and
a syllable or other phonetic representation from handwriting recognition, speech recognition or from keypad entry.

3. The method of claim 1, wherein said language is any of:
alphabetical; and
ideographic.

4. The method of claim 1, wherein the step of determining one or more word candidates further comprises the step of:
eliminating a plurality of combinations of word component candidates of the plurality of recognition results.

5. The method of claim 4, wherein the step of determining one or more word candidates further comprises the step of:
selecting a plurality of word candidates from a list of words of the language, the plurality of word candidates containing combinations of word component candidates of the plurality of recognition results.

6. The method of claim 5, further comprising the step of:
determining one or more likelihood indicators for the one or more word candidates to indicate relative possibilities of matching to the user input of the word from the plurality of recognition results and from data indicating probability of usage of a list of words.

7. The method of claim 6, further comprising the step of:
sorting the one or more word candidates according to the one or more likelihood indicators.

8. The method of claim 7, further comprising the step of:
automatically selecting one word from the one or more word candidates.

9. The method of claim 8, wherein the step of automatically selecting is performed on any of:
phrases in the language;
word pairs in the language; and
word trigrams in the language.

10. The method of claim 8, wherein the step of automatically selecting is performed based on any of:
morphology of the language; and
grammatical rules of the language.

11. The method of claim 8, wherein the step of automatically selecting is performed according to a context in which the user input of the word is received.

12. The method of claim 8, further comprising the step of:
predicting a plurality of word candidates based on a word that is automatically selected in anticipation of a user input of a next word.

13. The method of claim 7, further comprising the steps of:
presenting the one or more word candidates for user selection; and
receiving a user input to select a word from the plurality of word candidates.

14. The method of claim 13, wherein the plurality of word candidates are presented in an order according to the one or more likelihood indicators.

15. The method of claim 13, further comprising the step of:
predicting a plurality of word candidates based on the word selected in anticipation of a user input of a next word.

16. The method of claim 1, wherein one of the plurality of recognition results for a word component comprises an indication that any one of a set of word component candidates has an equal probability of matching a portion of the user input for the word.

17. The method of claim 1, wherein the data indicating probability of usage of the list of words comprises any of:
frequencies of word usages in the language;
frequencies of word usages by a user; and frequencies of word usages in a document.

18. The method of claim 1, further comprising any of the steps of:
automatically accenting one or more characters;
automatically capitalizing one or more characters;
automatically adding one or more punctuation symbols; and
automatically adding one or more delimiters.

19. A machine readable medium containing instruction data which when executed on a data processing system causes the system to perform a method for processing language input, the method comprising the steps of: receiving a plurality of recognition results for a plurality of word components, respectively, for processing a user input of a partial word of a language, at least one of the plurality of recognition results comprising a plurality of word component candidates and a plurality of probability indicators, the plurality of probability indicators indicating degrees of probability of matching of the plurality of word components to a portion of the user input relative to each other; and
predicting one or more word candidates that complete the partial word from the plurality of recognition results and from data indicating probability of usage of a list of words.

20. The medium of claim 19, wherein the step of determining one or more word candidates comprises the steps of:
eliminating a plurality of combinations of word component candidates of the plurality of recognition results; and
selecting a plurality of word candidates from a list of words of the language, the plurality of word candidates containing combinations of word component candidates of the plurality of recognition results.

21. The medium of claim 20, the method further comprising the steps of:
determining one or more likelihood indicators for the one or more word candidates to indicate relative possibilities of matching to the user input of the word from the plurality of recognition results and from data indicating probability of usage of a list of words;
sorting the one or more word candidates according to the one or more likelihood indicators; automatically selecting one from the one or more word candidates; and
predicting a plurality of word candidates based on the automatically selected one in anticipation of a user input of a next word.

22. A data processing system for processing language input, comprising:
means for receiving a plurality of recognition results for a plurality of word components respectively for processing a user input of a partial word of a language, at least one of the plurality of recognition results comprising a plurality of word component candidates and a plurality of probability indicators, the plurality of probability indicators indicating degrees of probability of matching of the plurality of word components to a portion of the user input relative to each other; and means for determining one or more word candidates that complete the partial word from the plurality of recognition results and from data indicating probability of usage of a list of words.

23. The data processing system of claim 22, wherein the means for determining one or more word candidates comprises:

means for eliminating a plurality of combinations of word component candidates of the plurality of recognition results; and means for selecting a plurality of word candidates from a list of words of the language, the plurality of word candidates containing combinations of word component candidates of the plurality of recognition results.

24. The data processing system of claim 23, further comprising:

means for determining one or more likelihood indicators for the one or more word candidates to indicate relative possibilities of matching to the user input of the word from the plurality of recognition results and from data indicating probability of usage of a list of words;

means for sorting the one or more word candidates according to the one or more likelihood indicators;

means for presenting the one or more word candidates for user selection; and means for receiving a user input to select one from the plurality of word candidates;

means for predicting a plurality of word candidates based on the selected one in anticipation of a user input of a next word;

wherein the plurality of word candidates are presented in an order according to the one or more likelihood indicators.

25. The data processing system of claim 22, further comprising means for: predicting a plurality of word candidates based on the word selected in anticipation of a user input of a next word.

* * * * *